United States Patent [19]
Clark et al.

[11] Patent Number: 6,131,117
[45] Date of Patent: Oct. 10, 2000

[54] TECHNIQUE FOR CORRELATING LOGICAL NAMES WITH IP ADDRESSES ON INTERNETWORKING PLATFORMS

[75] Inventors: Wayne Clark; Ravi Periasamy, both of Cary, N.C.

[73] Assignee: Cisco Technology, Inc., San Jose, Calif.

[21] Appl. No.: 08/999,271

[22] Filed: Dec. 29, 1997

[51] Int. Cl.[7] ................................................. G06F 13/14
[52] U.S. Cl. ..................... 709/223; 709/224; 709/238; 709/249
[58] Field of Search ................................. 709/220, 223, 709/224, 225, 230, 217, 218, 219, 238, 244, 249; 707/10

[56] References Cited

U.S. PATENT DOCUMENTS

| | | | |
|---|---|---|---|
| 4,644,532 | 2/1987 | George et al. | 370/94 |
| 4,827,411 | 5/1989 | Arrowood et al. | 364/300 |
| 4,864,559 | 9/1989 | Perlman | 370/60 |
| 4,893,307 | 1/1990 | McKay et al. | 370/94.1 |
| 5,021,949 | 6/1991 | Morten et al. | 364/200 |
| 5,027,350 | 6/1991 | Marshall | 370/85.13 |
| 5,142,622 | 8/1992 | Owens | 395/200 |
| 5,361,256 | 11/1994 | Doeringer et al. | 370/390 |
| 5,371,852 | 12/1994 | Attanasio et al. | 395/200 |
| 5,394,402 | 2/1995 | Ross | 370/94.1 |
| 5,473,608 | 12/1995 | Gagne et al. | 370/85.13 |
| 5,491,796 | 2/1996 | Wanderer et al. | 79/224 |
| 5,511,168 | 4/1996 | Perlman et al. | 395/200.15 |
| 5,517,622 | 5/1996 | Ivanoff et al. | 395/200.13 |

(List continued on next page.)

OTHER PUBLICATIONS

World Wide Web page http://www.cisco.com/univercd/cc/td/doc/cisintwk/ito_doc/dlsw.htm, *Data–Link Switching (DLSw)*, posted Feb. 23, 1999, pp. 1–8.
World Wide Web page http://www.cisco.com/warp/public/614.2.html, *DLSw and DLSw+*, posted Feb. 23, 1999, pp. 1–6.
World Wide Web page http://www.cisco.com/warp/public/558.16.html, *Cisco Catalyst Workgroup Switch Version 3.0*, posted Jul. 15, 1998, pp. 1–5.
World Wide Web page http://www.cisco.com/warp/public/538/7.html, *Cisco VLAN Roadmap*, posted Jul. 15, 1998, p. 1–9.
IEEE Computer Society, *Draft Standard for Virtual Bridged Local Area Networks*, May 16, 1997, pp. 1–10, 70–72.
IAC Newsletter Database, *Cisco Announces New Fast Ethernet Interface*, Copyright 1995, pp. 2–3.
IAC Newsletter Database, *Cisco Announces Token–Ring Switching Products*, Copyright 1995, pp. 4–5.
L. Wells, et al., *Data Link Switching: Switch–to–Switch Protocol*, Apr., 1995, pp. 1–91.
World Wide Web page http://www.cisco.dk/warp/public/100/44.html, *SNA Internetworking*, posted May 10, 1999, pp. 1–5.
World Wide Web page http://www.cisco.com/warp/public/558/61.html, *Cisco Channel Interface Processor*, posted May 10, 1999, pp. 1–10.

*Primary Examiner*—Zarni Maung
*Assistant Examiner*—Jason D. Cardone
*Attorney, Agent, or Firm*—Cesari and McKenna, LLP

[57] ABSTRACT

Heterogeneous resources of an integrated network environment are managed from a single network management station by correlating information pertaining to those resources. The integrated network environment generally comprises SNA and NetBIOS entities coupled to IP routers. Address information pertaining to selected IP routers and SNA entities are acquired by the routers through a series of SNA message flows. Similarly, a series of NetBIOS message flows among those IP routers coupled to the NetBIOS entities result in the acquisition of IP and NetBIOS address information of these resources at the routers. This information is used to create an IP-centric map of the network. In addition, the SNMP agents provide name information pertaining to the SNA-specific and NetBIOS-specific resources to the console using an SNMP protocol. The name information are overlaid on the map to facilitate monitoring of those specific resources by the SNMP tool.

22 Claims, 6 Drawing Sheets

U.S. PATENT DOCUMENTS

| | | | |
|---|---|---|---|
| 5,612,959 | 3/1997 | Takase et al. | 370/390 |
| 5,617,421 | 4/1997 | Chin et al. | 370/402 |
| 5,675,740 | 10/1997 | Heimsoth et al. | 709/228 |
| 5,678,006 | 10/1997 | Valizadeh et al. | 395/200.02 |
| 5,684,800 | 11/1997 | Dobbins et al. | 370/401 |
| 5,684,988 | 11/1997 | Pitchaikani et al. | 395/615 |
| 5,694,595 | 12/1997 | Jacobs et al. | 707/9 |
| 5,740,171 | 4/1998 | Mazzola et al. | 370/392 |
| 5,742,604 | 4/1998 | Edsall et al. | 370/401 |
| 5,752,003 | 5/1998 | Hart | 395/500 |
| 5,764,636 | 6/1998 | Edsall | 370/401 |
| 5,796,732 | 8/1998 | Mazzola et al. | 370/362 |
| 5,802,053 | 9/1998 | Bollella et al. | 370/401 |
| 5,802,313 | 9/1998 | Mitchell et al. | 395/200.68 |
| 5,835,728 | 11/1998 | Shinomiya et al. | 709/242 |
| 5,845,081 | 12/1998 | Rangarajan et al. | 395/200.54 |
| 5,909,550 | 6/1999 | Shankar et al. | 709/227 |

TECHNIQUE FOR CORRELATING LOGICAL NAMES WITH IP ADDRESSES ON INTERNETWORKING PLATFORMS

FIELD OF THE INVENTION

This invention relates to computer networks and, more particularly, to management of heterogeneous resources on internetworking platforms of a computer network environment.

BACKGROUND OF THE INVENTION

A computer network is a geographically distributed collection of interconnected subnetworks for transporting data between stations, such as internetworking computer platforms. A local area network (LAN) is an example of such a subnetwork consisting of a transmission medium, such as coaxial cable or twisted pair, that provides relatively short distance communication among interconnected stations. The stations typically communicate by exchanging discrete packets or frames of data according to predefined protocols. In this context, a protocol consists of a set of rules defining how the stations interact with each other.

Most networks are typically organized as a series of hardware and software levels or "layers" within each station. These layers interact to format data for transfer between, e.g., a source station and a destination station communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services.

In an attempt to standardize network architectures, i.e., the sets of layers and protocols used within a network, a generalized model has been proposed by the International Standards Organization (ISO). The model, called the Open Systems Interconnection (OSI) reference model, is directed to the interconnection of systems that are "open" for communication with other systems. The proposed OSI model has seven layers which are termed, in ascending interfacing order, the physical, data link, network, transport, session, presentation, and application layers. These layers are arranged to form a "protocol stack" in each station of the network.

FIG. 1 illustrates a schematic block diagram of prior art protocol stacks 125 and 175 used to transmit data between a source station 110 and a destination station 150, respectively, of a LAN 100. Each protocol stack comprises a collection of protocols, one per layer, and is preferably structured according to the OSI seven-layer model. As can be seen, the protocol stacks 125 and 175 are physically connected through a communications channel 180 at the physical layers 124 and 164. For ease of description, the protocol stack 125 will be described.

In general, the application layer 112 contains a variety of protocol functions that are commonly needed by software processes, e.g., sending process 104, executing on the station, while the presentation layer 114 is responsible for the presentation of transmitted data in a meaningful manner to the application layer. The session layer 116, transport layer 118 and, as described herein, the network layer 120 are substantially involved in providing pre-defined sets of services to aid in connecting the source station to the destination station.

IEEE standard 802 defines a flexible network architecture oriented to the implementation of LANs. Although it generally conforms with the OSI model, the IEEE approach addresses only the lowest two layers of that model, the physical and data link layers. Specifically, the physical layer 124 is concerned with the actual transmission of signals across the communication channel; in this context, the physical layer defines the types of cabling, plugs and connectors used in connection with the channel.

The data link layer 122, on the other hand, is responsible for transmission of data from one station to another. In the IEEE 802 architecture, the data link layer is divided into two sublayers: logical link control (LLC) and media access control (MAC). The LLC sublayer 180 allows the overlying network layer to access the services of the LAN without regard to the actual network implementation; more specifically, the LLC layer initiates control signal interchange, organizes data flow, interprets commands and generates responses.

The MAC sublayer 182 is primarily concerned with controlling access to the transmission medium and, to that end, defines rules or procedures by which the stations must abide in order to share the medium. The MAC layer further provides addressing and framing functions, the latter including the addition of header and trailer information needed to identify the boundaries of frames, to synchronize communication between source and destination stations.

Data transmission over the LAN 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted to the protocol stack 175 of the destination station 150, where they are passed up that stack to a receiving process 174. Data flow is schematically illustrated by solid arrows.

Although actual data transmission occurs vertically through the stacks, each layer is programmed as though such transmission were horizontal. That is, each layer in the source station 100 is programmed to transmit data to its corresponding layer in the destination station 150, as schematically shown by dotted arrows. To achieve this effect, each layer of the protocol stack 125 in the source station 110 typically adds information (in the form of a header field) to the data frame generated by the sending process as the frame descends the stack. At the destination station 150, the various encapsulated headers are stripped off one-by-one as the frame propagates up the layers of stack 175 until it arrives at the receiving process.

As noted, a significant function of each layer in the OSI model is to provide services to the other layers. One type of service offered by the layers is a "connectionless" network service where each transmitted packet carries the full address of its destination through the network. A function of a router is determining the next station to which the packet is sent; this routing function is preferably performed by the network layer within each station. Moreover, a network layer protocol is generally used to implement a connectionless network service, the latter of which primarily defines a packet format. When the network layer receives a packet from the transport layer for transmission over the network, it encapsulates the packet with a header containing, inter alia, source and destination addresses. An example of a network layer protocol is Internet (IP) network layer protocol.

A vendor-developed network architecture in wide-spread use is the Systems Network Architecture (SNA) developed by International Business Machines Corp. SNA is a mainframe-oriented network architecture that also uses a layered approach. The services included within this architecture are generally similar to those defined in the OSI model, although the SNA architecture addresses only the network layer (120, 160) through the presentation layer (114, 154). However, SNA is significant to LAN technology because a LAN must often connect to, and be made a logical part of, an SNA mainframe network.

Access to the LAN is typically shared among the stations in accordance with various access control methods depending upon the topology of the subnetwork and the type of transmission control employed. A popular subnetwork topology is a ring network that is typically formed by configuring the communication channel as a loop and coupling the stations at intervals around the loop. The stations communicate by transmitting and receiving discrete signals in the form of data frames according to predefined protocols. Acceptance of a frame by each station, in turn, is determined on the basis of an address contained in the frame.

With LANs that employ a ring topology, a commonly used access control method is token passing. Token passing is a form of distributed transmission control wherein all the stations on the subnetwork cooperate in controlling access to the communication channel. Here, a small message or token is passed from one station to the next along the ring. If the token is marked as free, the station receiving it can transmit a message over the ring. A token ring network is an example of a ring topology that uses token passing as an access control method.

Token ring networks may be interconnected using intermediate stations, such as a router or bridge, whose primary function is to transfer frames between the rings. A route is the path a frame travels through the subnetworks from a source station to a destination station. Depending upon how the rings are interconnected, there may be more than one possible path for a frame to follow. Once the source station has "discovered" an optimal path to the destination, it transmits specifically-routed frames over the subnetworks; as the name implies, these frames include information specifying the route to, along with the address of, the destination station.

NetBIOS is a high-level programming interface that provides functions associated with the network, transport and session layers of the OSI model. In particular, the NetBIOS interface offers a reliable data transfer service based on the establishment of a session (i.e., virtual circuit connection) between two communicating stations. NetBIOS also provides a naming facility for associating names with logical entities of a station such that messages can be directed to a NetBIOS entity by specifying its name rather than its network address.

As noted, routers and bridges may be employed to interconnect a plurality of LANs; this, in turn, extends the effective "size" of the computer network and increase the number of communicating stations. Such an enlarged topology of internetworked computing stations requires services directed to managing the network. Lower-layer standards, such as IEEE 802, address network management to some extent, yet they typically do not deal with complex network management requirements associated with the higher network layers.

Network management applications are available to address certain of the management requirements of a complex network, but they typically deal with a single, protocol-centric view of the network. For example, SNA-based management systems (such as NetView) provide a SNA-centric view of entities coupled to the network. These entities include a physical unit (PU), i.e., a component that monitors a station's resources, and a logical unit (LU) which consists of logical services by which a user may access the SNA network. On the other hand, an IP-centric network view of resources (such as IP routers) is provided by management systems employing, e.g., a Simple Network Management Protocol (SNMP). Here, SNMP agents are associated with the routers and these agents communicate with the management console, e.g., a workstation, via a SNMP protocol.

A network management problem arises in the context of an integrated network environment comprising interconnected heterogeneous resources, such as SNA and NetBIOS entities, and IP routers. A host computer running, e.g., NetView is capable of managing the SNA entities and, in particular, the frame traffic originated by PU/LU components. However, because the routers are IP devices that encapsulate these frames within IP protocol packets, the management tool has no knowledge of the routers and thus cannot manage the encapsulated SNA traffic.

A known solution to this heterogeneous network management problem uses two distinct management application platforms: the Netview application executing on the host computer to manage the SNA resources and a SNMP application executing on a management console station to manage the IP routers. Use of two distinct management platforms is generally cumbersome and inefficient, particularly because there is no means for correlating the SNA and IP resources. The present invention is directed to the efficient management of an integrated computer network of heterogeneous resources and, further, to a correlation technique that allows such management from a single console station.

SUMMARY OF THE INVENTION

The invention comprises a technique for correlating information pertaining to heterogeneous resources of an integrated computer network to enable management of the network from a single console workstation. The integrated network environment is generally managed by a predetermined application tool executing on the management console that provides an application-centric map of the network for communicating with resources conversant with the application tool. Information pertaining to other protocol-specific resources are overlaid on the map to facilitate monitoring of those protocol-specific resources by the application tool and to assist in problem isolation. As a result, the console can interactively access the application-centric resources while also obtaining status information from the protocol-specific resources of the network.

In the illustrative embodiment, the predetermined application tool is a Simple Network Management Protocol (SNMP) tool executing on a management console, whereas the protocol-specific resources are System Network Architecture (SNA) physical unit (PU) and logical unit (LU), and NetBIOS entities. The integrated computer network comprises these entities coupled to a host computer by way of application-centric resources, such as Internet protocol (IP) routers.

In accordance with the invention, a series of SNA flows consisting of data message exchanges among the IP routers coupled to the SNA entities and the host computer result in the acquisition of IP and SNA address information pertaining to these resources by the routers. Similarly, a series of NetBIOS flows consisting of data message exchanges among the IP routers coupled to the NetBIOS entities result in the acquisition of IP and NetBIOS address information of these resources at the routers. This information is used to create an IP-centric map of the network. In addition, the SNMP agents provide name information pertaining to the SNA-specific and NetBIOS-specific resources to the console using the SNMP protocol. The SNA-specific and NetBIOS-specific name information are thereafter overlaid on the IP-centric map to correlate the SNA and IP resources, and the NetBIOS and IP resources. Accordingly, there is no need for "external" information gathering for the SNA and NetBIOS entities, i.e., acquiring name information of these entities using tools other than SNMP.

The inventive correlation technique allows the SNMP console to manage relationships between the resources for purposes of, e.g., activating/deactivating the resources and monitoring SNA/NetBIOS frame traffic encapsulated within IP protocol packets. Moreover, the technique may be used for troubleshooting operations to identify associations between specific IP, NetBIOS and SNA resources, and to generally view dependency relationships between such resources in the heterogeneous environment.

BRIEF DESCRIPTION OF THE DRAWINGS

The above and further advantages of the invention may be better understood by referring to the following description in conjunction with the accompanying drawings in which like reference numbers indicate identical or functionally similar elements.

DESCRIPTION OF THE ILLUSTRATIVE EMBODIMENTS

Figure 2:
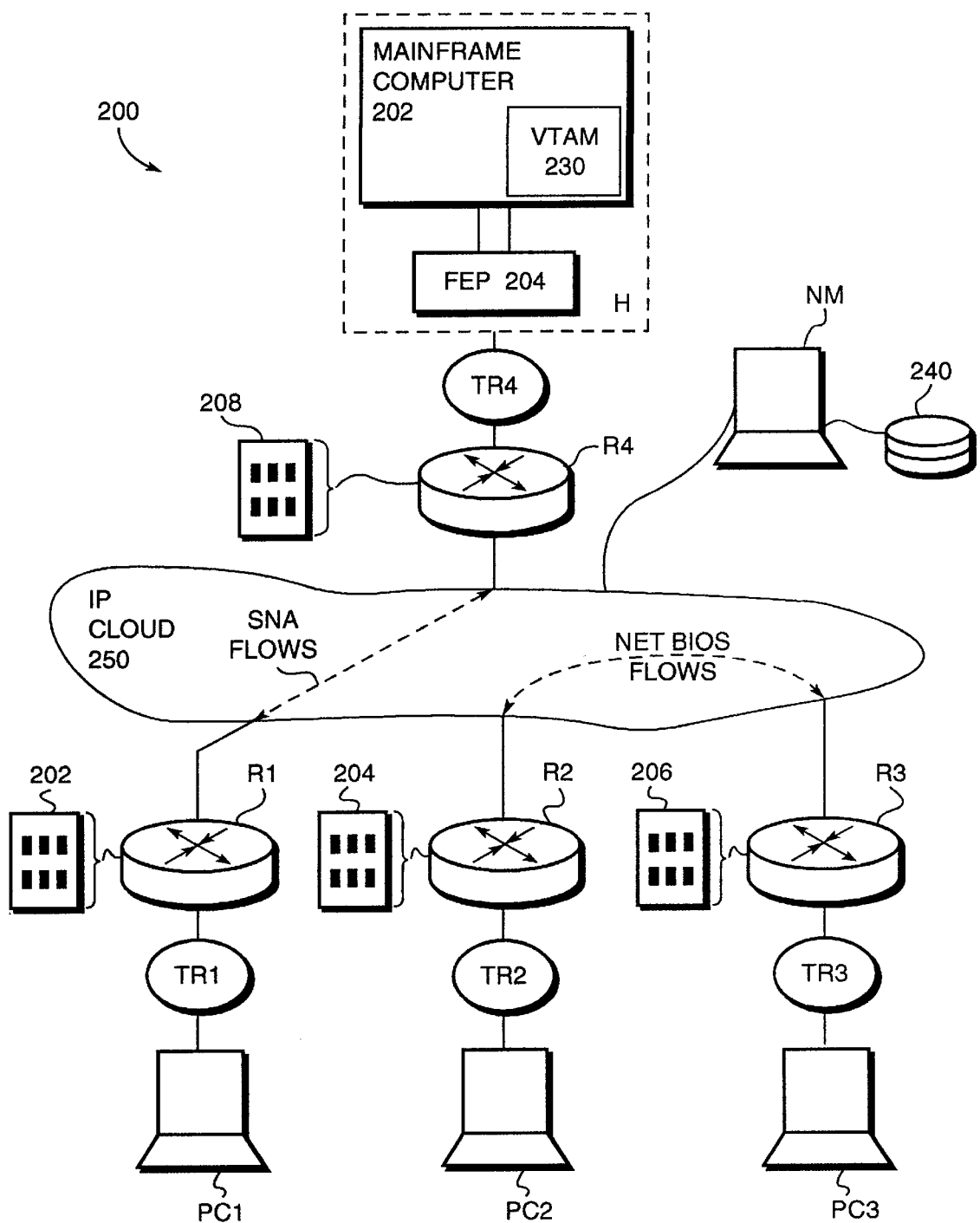
FIG. 2 is a block diagram of a collection of interconnected subnetworks of a computer network having a plurality of stations on which the present invention may advantageously operate.

FIG. 2 is a block diagram of a computer network 200 comprising a collection of interconnected subnetworks attached to a plurality of stations. The stations are typically internetworking computer platforms comprising a host computer H, a plurality of personal computers PC1–3, a network management console NM and a plurality of intermediate stations R1–4. Each station typically comprises a central processing unit (CPU), a memory unit and an input/output (I/O) unit. The memory may comprise storage locations typically composed of random access memory devices, which are addressable by the CPU and I/O unit. An operating system, portions of which are typically resident in memory and executed by CPU, functionally organizes the node by, inter alia, invoking network operations in support of software processes executing on the CPU.

The I/O unit, in turn, connects the station to mass storage devices, such as disks, and to the subnetworks. The NM console workstation further includes a conventional display monitor with a display screen and cursor control devices, such as a keyboard, connected to I/O unit. A window environment, such as a graphical user interface (GUI), is preferably displayed on the screen as a graphical display to facilitate interactions between a user and the console. For the NM workstation and intermediate stations R1–4, the disk may function as a database for storing routing information, as described further herein. Typically, the I/O unit receives information, such as control, address and data signals, from the keyboard or the database, and provides that information to the CPU for display on the screen or for transfer over the subnetworks.

The subnetworks included within system 200 are preferably local area networks (LANs) interconnected to an IP backbone network cloud 250 by intermediate stations R1–4. Communication among the stations coupled to the LANs is typically effected by exchanging discrete data frames specifying addresses of, e.g., source and destination stations, whereas for communication over the IP cloud 250, these frames are encapsulated within transmission control protocol (TCP)/IP packets. In the illustrative embodiment of the invention, the LANs are preferably token ring subnetworks TR1–4 and the intermediate stations are preferably Internet protocol (IP) routers. In an alternate embodiment of the invention, the LANs may comprise other subnetworks, such as FDDI, and the intermediate stations may comprise bridges.

Further to the illustrative embodiment, the host computer H is preferably a Systems Network Architecture (SNA) host entity comprising a mainframe computer 202 coupled to a channel-attached front end processor (FEP) 204; in addition, PC1 is an SNA end station entity, such as an advanced peer-to-peer network (APPN) node, and PC2–3 are configured as NetBIOS entities. Communication between the stations is typically peer-to-peer in accordance with a client-server computing model, although the host and PC1 may interact via hierarchical, master-slave SNA computing. When interconnected by IP routers R1–4, these entities form an integrated network of heterogeneous resources. The routers are generally managed by a predetermined protocol application, e.g., a Simple Network Management Protocol (SNMP) tool, executing on the network management NM station or console.

The SNA entity PC1 includes a physical unit (PU) and one or more logical units (LU). A PU is defined as a component that monitors the station's resources, such as a concentration of LUs. Each station in a SNA network contains a PU and an LU, and is identified by it's type. The PU is responsible for connecting the LUs to the host in a hierarchical arrangement. LUs are also identified as being of a particular type, and the LU type defines a particular set of SNA services implemented by the LU. As an example, the PU may be a computer coupled to an LU, the latter of which may comprise an intelligent storage device or another computer station; alternatively, the LU and PU could be processes executing within the same station.

In general, when a source station transmits a frame over a LAN, the frame is sent to all stations on that LAN. If the intended recipient of the frame is connected to another LAN, the frame is passed over any intermediate-connecting router to that other LAN. Conventional source routing techniques may be employed to determine the route to the destination. Here, the source station determines the route to use by sending a broadcast message to all stations and then receiving a response from the intended recipient with the information needed to address and route transmissions directly to that destination. NetBIOS uses source routing to specify the route to an intended recipient. However, if the source knows the address of, and the optimal route to, a destination station, the token ring frame may be transmitted to the destination as a specifically-routed frame.

Figure 1:
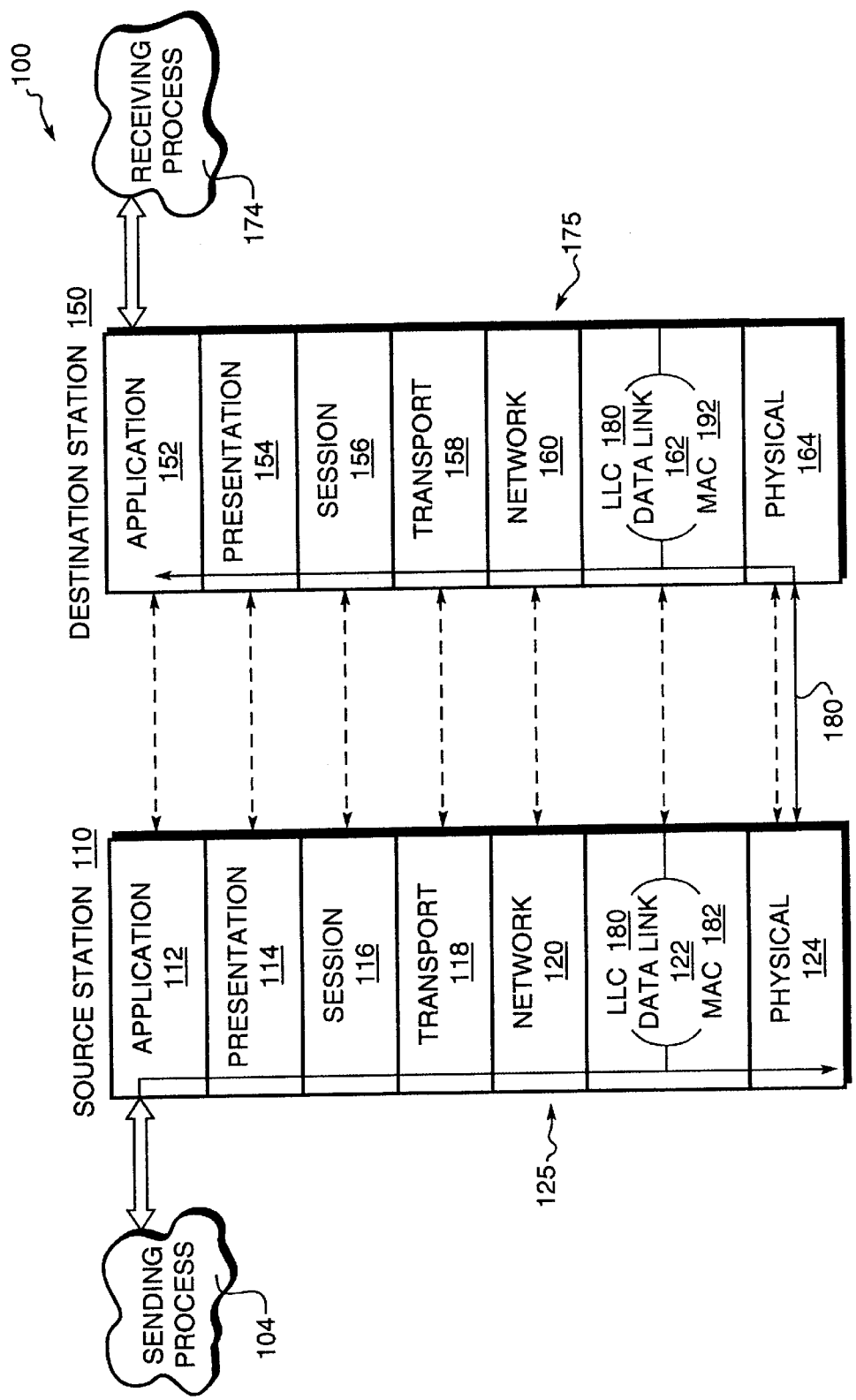
FIG. 1 is a schematic block diagram of prior art protocol stacks used to transmit data between a source station and a destination station of a computer network.

As noted, a function of the router is to determine the next node to which the frame is sent; this routing function is preferably performed using the network layer of a protocol stack within each station. In the case of a bridge, its primary function is to store and forward frames between LANs; this function is performed by the data link layer of the stack. Specifically, the LANs must have compatible implementations of the logical link control (LLC) sublayer (FIG. 1) despite any differences in frame formats and sizes between the media access control (MAC) sublayers of the LANs; in any event, these latter differences must be resolved by the intermediate station.

As an example, assume the host computer H sends a token ring frame having a destination address of an SNA entity, such as PU of PC1, over TR4. The frame is received by router R4 which encapsulates the token ring frame in an IP packet by adding an IP network header to the frame. The network layer header contains the IP address of the sending/source station which, in this example, is R4. In a configuration comprising two routers coupled together by an IP network cloud, the first router encapsulates the token ring frame to an IP packet format and the second router decapsulates the IP packet to recover the original frame. Here, R4 passes the encapsulated packet, e.g., over IP cloud 250 to R1 in accordance with a routing algorithm executed on R4. R1, in response to receiving the IP packet, decapsulates it by stripping the IP header and recovering the original token ring frame. The original frame is then transmitted over TR1 to the PC1.

It should be noted that, from the perspective of an SNA management application executing on the host computer, routers appear as bridges in the integrated network 200. That is, a router actually functions as a source route bridge in the SNA portion of the network, while functioning as a router in the IP portion of the network. Moreover, from the perspective of the host computer and PU, a virtual token ring (VTR) lies between two adjacent routers, whether or not a ring actually exists. Remote-Source-Route-Bridging (RSRB) is a software component in the router that permits transmission of token ring traffic across an IP network. Specifically, RSRB functions to give the IP network the appearance of a single hop in a token ring network; this hop is the VTR. The association of the two adjacent routers is called a "peer" relation and this relation must exist to exchange RSRB traffic across the VTR. It should be noted that in the case of DLSw, VTR is of local significance only.

Typically, management of SNA entities within network 200 takes place on the host computer H in accordance with a network management application program, such as NetView, executing on the host. The application can access the status of the PU and LU entities by virtue of their definitions contained in a specialized data structure 230 stored on the host computer. This data structure is a virtual telecommunication access method (VTAM) table 230 having entries whose contents define the PUs and LUs with respect to the host computer. The content definitions of the entries comprise a name (e.g. PU name) and exchange identifier (XID), the latter being a unique identifier that identifies each SNA resource to the host. That is, the XID is unique for each PU on a network at a given time.

The NetView application manages those SNA resources known to it; as used in this context, the term "managing" means that the application program can check and change the status of the resources, and can further control those resources to acquire, e.g., information leading to the traffic patterns on the resources. However, the NetView application cannot manage the NetBIOS entities nor the components in the routers R1–4 that encapsulate SNA traffic. As noted, the routers R1–4 are preferably managed by the SNMP tool executing on the NM console which communicates with SNMP agents resident on the routers. The IP routers are key to communication between the host and PUs/LUs because they facilitate the flow of token ring data frames throughout the system 200 by directing those frames to the proper receiving stations.

Figure 3A:
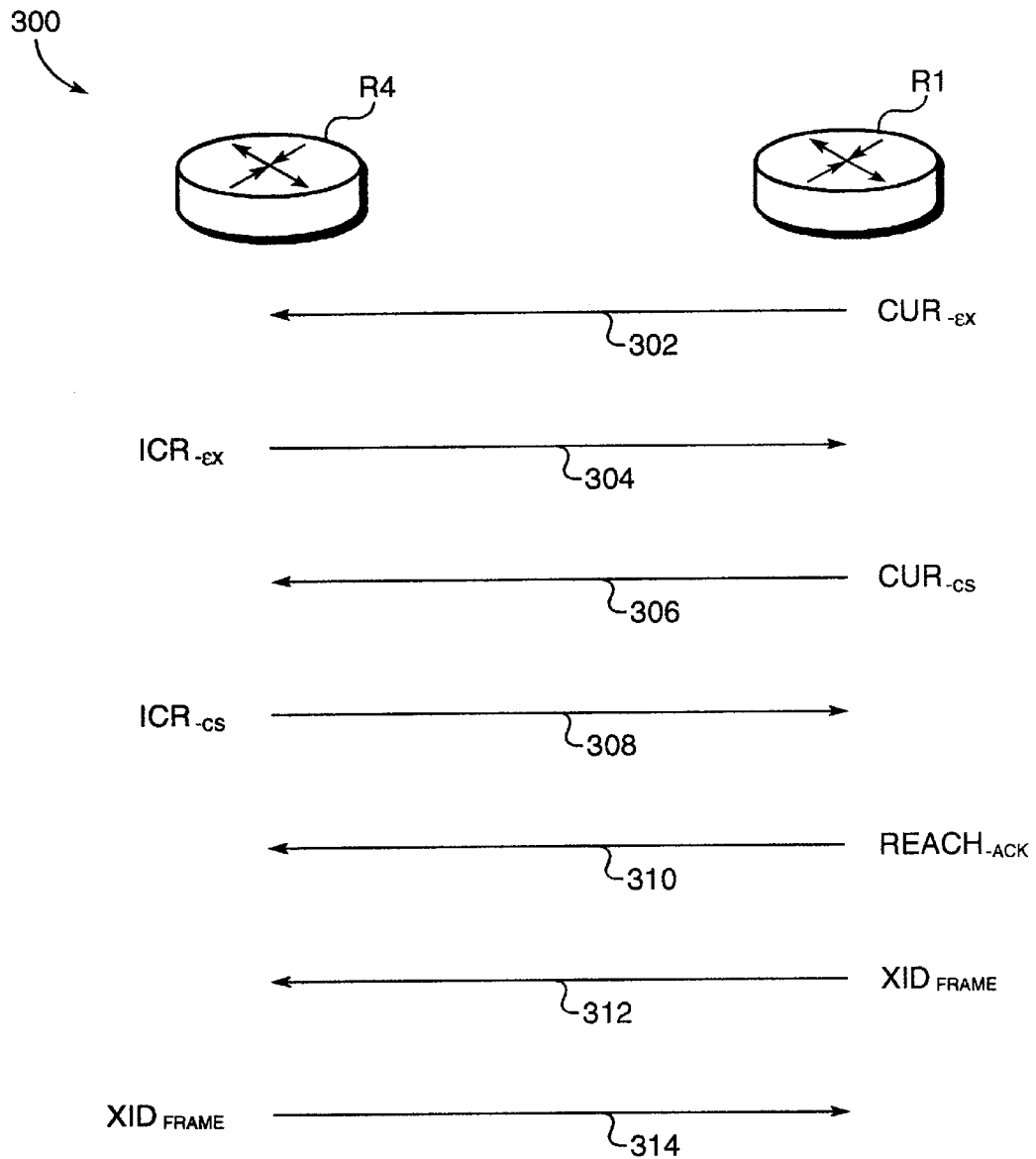
FIG. 3A is a diagram illustrating a series of System Network Architecture (SNA) message exchange flows among routers and SNA entities to acquire Internet Protocol (IP) and SNA address information according to the present invention.

A technique is therefore provided for correlating information pertaining to the heterogeneous resources to enable management of the integrated computer network from a single console. In accordance with the invention, IP and SNA address information pertaining to routers R1, R4, host computer H and PC1 are acquired by the routers through a series of SNA flows consisting of data message exchanges among the routers and SNA entities. FIG. 3A is a diagram illustrating these SNA flows 300 between routers R1 and R4. The flows are typically initiated by the remote router R1 in response to a test request for a destination MAC address received at that router from PC1. Initially, a conventional can-you-reach explorer (CUR_ex) frame flow 302 for the destination MAC address is generated by R1 and forwarded to R4 over IP network cloud (as indicated by link 252 of FIG. 2); as noted, all frames transmitted over the IP cloud 250 are preferably encapsulated within a TCP/IP message packet. Upon receipt of the message, R4 returns a conventional I-can-reach explorer (ICR_ex) message flow 304 if R4 is able to reach the destination MAC address; as a result of the packet flows 302, 304, each router R1 and R4 has knowledge of each other's IP address.

Flows 306–310 comprise a 3-way handshake exchange between R1 and R4. In flow 306, R1 issues a conventional can-you-reach circuit set-up (CUR_cs) message to R4, which replies with an I-can-reach circuit set-up (ICR_cs) message flow 308; R1 then responds to R4 with a conventional reach acknowledgement (REACH_ack) message flow 310.

Figure 3B:
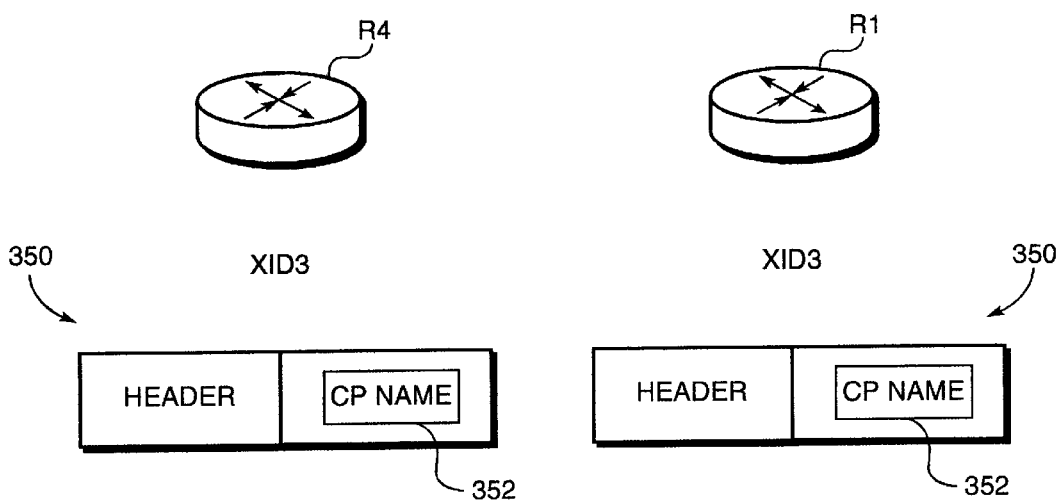
FIG. 3B is a schematic block diagram illustrating the contents of the an XID 3 image that is used with the present invention.

The next flow over link 252 is an XID frame originated by PC1 and transmitted from R1 to R4 via flow 312; R4 then passes the frame onto host computer H. Included in the XID frame is an XID 3 image; FIG. 3B is a schematic block diagram illustrating the contents of the XID 3 image 350 which comprises a control vector identifying the control point (CP) name 352 of the device served by router R1, i.e., PC1. In response to receiving the XID message, the host computer H issues an XID response having an XID 3 image identifying the CP name of the device; that is, the XID 3 image identifies the CP name of the APPN node in H. R4 forwards the XID response to R1 by way of flow 314. As a result of the flows 302–314, the routers R1 and R4 have acquired information comprising the IP addresses of R1 and R4, along with the CP names of devices H and PC1 served by the routers. This information is loaded into management information blocks (MIB 202, 208) and stored at the routers R1 and R4.

Figure 4:
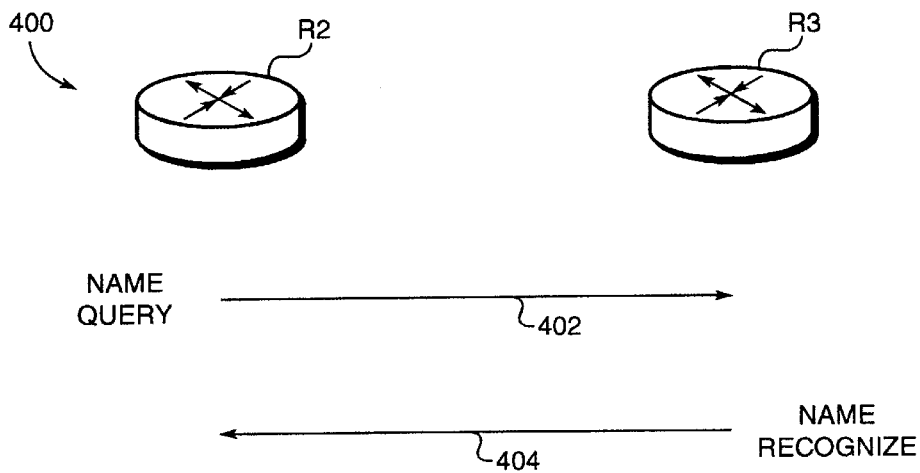
FIG. 4 is a diagram illustrating a series of NetBIOS message exchange flows among routers and NetBIOS entities to acquire IP and NetBIOS address information according to the present invention.

Similarly, a series of NetBIOS flows consisting of data message exchanges among IP routers R2–3 coupled to the NetBIOS entities PC2–3 result in the acquisition of IP and NetBIOS address information of these resources at the routers. FIG. 4 is a diagram illustrating the NetBIOS flows 400 between routers R2–3. Because NetBIOS defines "any-to-any" communication among its stations, there is no hierarchical relationship involving communication with the host computer H. In fact, there is a client-server relationship between R2 and R3 as a result of PC2 attempting to establish a connection with PC3.

Initially, a conventional NAME QUERY frame is sent to R2 from PC2. The NAME QUERY frame includes the NetBIOS names of the source and destination stations associated with the attempted circuit connection. Upon receiving the frame, R2 broadcasts a NAME QUERY message over the IP cloud 250, where it is received by R3 as indicated by flow 402. R3 accepts the NAME QUERY packet because the destination NetBIOS name contained therein is a device (PC3) served by R3. Since the message is encapsulated within an IP packet, R3 has knowledge of the IP address of the sending/source station (R2).

In response to receipt of the packet, R3 replies with a conventional NAME RECOGNIZED packet transfer to R2 as indicated by flow 404. This packet also contains the source IP address of the sending station which, for the NAME RECOGIZED message, is R3; R2 thus has knowledge of the IP address of R3. As a result of the flows 402–404, routers R2–3 have acquired information comprising the IP addresses of R2–3, along with the NetBIOS names of PC2–3. Again, this information is loaded into MIBs 204, 206 and stored at the routers R2–3.

It should be noted that the IP addresses of the routers are known to the NM console a priori and stored in the MIBs on a database 240 as topology information. The IP addresses enable communication between the console and SNMP agents of the routers R1–4 using a SNMP protocol. The MIBs and SNMP protocol, and their use in providing network management information between SNMP management stations and agents are well-known and described in, e.g., *SNMP, SNMPv2 and RMON* by William Stallings, printed by Addison Wesley Publishing Company, 1996. The information is then used to create an IP-centric map of the network; an example of a technique for creating an IP-centric map is disclosed in commonly assigned U.S. patent application Ser. No. 08/732,998 titled Address Correlation Technique for Managing Heterogeneous Resources of a Computer Network, by Ravindra Shankar et al, which application is hereby incorporated by reference as though fully set forth herein.

Figure 5:
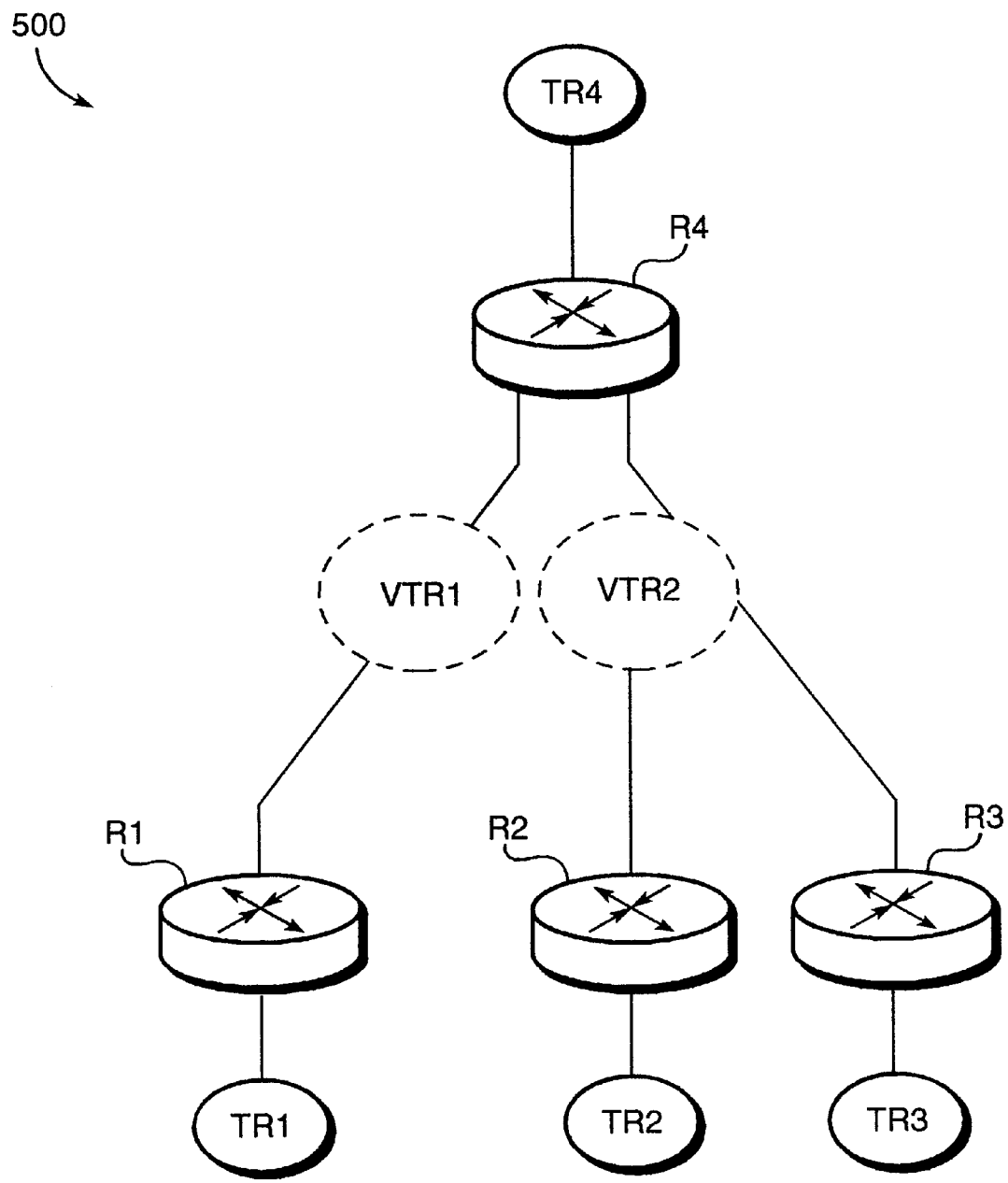
FIG. 5 is a schematic block diagram of an IP-centric map of the computer network of FIG. 2 that is created using the correlation technique of the present invention.

Specifically, the topology information stored on an IP-centric portion of a NM database 240 enables the NM console to determine the status and configurations of the routers; thereafter, the console uses this information to create the IP-centric map of the computer network. FIG. 5 is a schematic block diagram of an IP-centric map 500 of the computer network (FIG. 2) as displayed on the GUI screen of the NM monitor. The map is preferably created by querying the IP routers R1–R4 as to their structure and organization, and their interconnecting token ring LANs.

In addition, the SNMP agents provide name information pertaining to the SNA-specific and NetBIOS-specific resources (PC1–3 and host H) to the console using the SNMP protocol. According to another aspect of the invention, the SNA-specific and NetBIOS-specific name information are overlaid on the IP-centric map to correlate the SNA, NetBIOS and IP resources. An example of a technique for correlating application-specific and protocol-specific information is also disclosed in the aforementioned commonly assigned U.S. patent application Ser. No. 08/732, 998 titled Address Correlation Technique for Managing Heterogeneous Resources of a Computer Network, by Ravindra Shankar et al. Such correlation facilitates monitoring of the resources by SNMP to assist in problem isolation by allowing the NM console to interactively access the IP routers while also obtaining status information from the SNA and NetBIOS entities. Overlaying operations performed at the NM console generally comprise table look-ups and compares to correlate the information sets.

Figure 6:
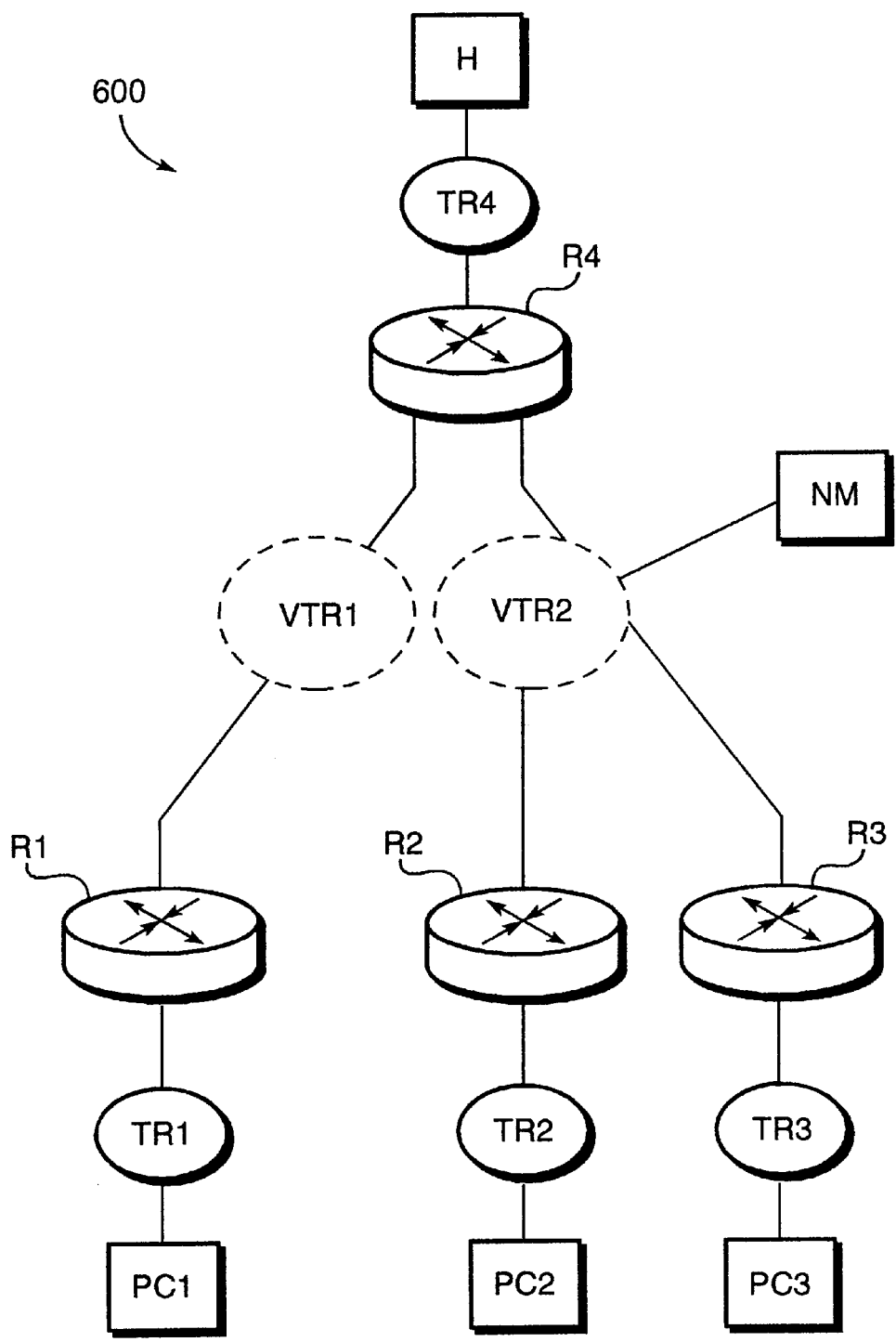
FIG. 6 is a schematic block diagram of the topology of an integrated network map of heterogeneous resources that is created in accordance with the correlation technique of the present invention.

Thereafter, each router is polled using the SNMP protocol to constantly update the database with current router information in the event an end system is added or removed. The updated information can then be displayed graphically on the GUI screen to depict the topology of SNA and NetBIOS entities connected to the host computer H via non-SNA devices. FIG. 6 is a schematic block diagram of the topology of an integrated network map 600 of heterogeneous resources that is created in accordance with the correlation technique described herein.

In summary, the invention provides a technique that correlates route information from one set of resources with topology information from a different set of resources. Advantageously, the correlation technique allows the NM console to manage relationships between the SNA, NetBIOS and IP resources for purposes of activating/deactivating those resources and monitoring SNA/NetBIOS frame traffic encapsulated within IP protocol packets. The correlation technique thus obviates the need for "external" information gathering for the SNA and NetBIOS entities, i.e., acquiring name information of these entities using tools other than SNMP. In addition, the inventive correlation technique may be used for troubleshooting operations to identify associations between specific IP, NetBIOS and SNA resources, and to generally view dependency relationships between such resources in the heterogeneous environment.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for correlating information pertaining to heterogeneous resources of an integrated computer network having a host computer and a management station coupled to the network, the heterogeneous resources including routers coupled to first and second protocol-specific resources, the method comprising the steps of:

acquiring first address information pertaining to a first group of routers coupled to the first protocol-specific resources at the first group of routers, the address information acquired through a series of first message flows among the first group of routers and first protocol-specific resources;

acquiring second address information pertaining to a second group of routers coupled to the second protocol-specific resources at the second group of routers, the address information acquired through a series of second message flows among the second group of routers and the second protocol-specific resources;

transferring the first address information from the first group of routers to the management station in accordance with an application tool running on the management station and the first group of routers, the first address information used to generate an application-centric map of the network specifying information pertaining to routers;

transferring the second address information from the second group of routers to the management station in accordance with the application tool running on the management station and the second group of routers; and overlaying the second address information onto the application-centric map to correlate the first and second address information and, thus, to facilitate monitoring of the protocol-specific resources by the management station.

2. The method of claim 1 wherein the routers are Internet Protocol (IP) routers and wherein the application tool is a simple network management protocol (SNMP) tool configured to generate an IP-centric map specifying topology information.

3. The method of claim 2 wherein the first protocol-specific resources are System Network Architecture (SNA) entities and wherein the series of first message flows comprises SNA message flows.

4. The method of claim 3 wherein the first address information acquired through the SNA message flows comprises IP addresses of the first group of IP routers along with control point (CP) names of the SNA entities.

5. The method of claim 4 further comprising the step of loading the first address information into first management information blocks (MIBs) stored at the first group of IP routers.

6. The method of claim 5 wherein wherein the second protocol-specific resources are NetBIOS entities and wherein the series of second message flows comprises NetBIOS message flows.

7. The method of claim 6 wherein the second address information acquired through the NetBIOS message flows comprises IP addresses of the second group of IP routers along with NetBIOS names of the NetBIOS entities.

8. The method of claim 7 further comprising the step of loading the second address information into second MIBs stored at the second group of IP routers.

9. The method of claim 8 wherein the step of transferring the first address information comprises the step of transferring the IP addresses and CP names stored in the first MIBs to the management station in accordance with the SNMP tool.

10. The method of claim 9 wherein the step of transferring the second address information comprises the step of transferring the IP addresses and NetBIOS names stored in the second MIBs to the management station in accordance with the SNMP tool.

11. A system for correlating information pertaining to heterogeneous resources of an integrated computer network having a host computer and a management station coupled to the network, the heterogeneous resources including routers coupled to first and second protocol-specific resources, the system comprising:

means for acquiring first address information pertaining to a first group of routers coupled to the first protocol-specific resources at the first group of routers;

means for acquiring second address information pertaining to a second group of routers coupled to the second protocol-specific resources at the second group of routers;

means for transferring the first address information from the first group of routers to the management station in accordance with an application tool running on the management station and the first group of routers;

means for transferring the second address information from the second group of routers to the management station in accordance with the application tool running on the management station and the second group of routers;

an application tool executing on the network management station for generating an application-centric map of the network using the first address information; and means for correlating the information pertaining to the application-specific and protocol-specific resources at the network management station to enable management of the network heterogeneous resources from the management station.

12. The system of claim 11 wherein the means for acquiring first address information comprises a series of first message flows among the first group of routers and first protocol-specific resources.

13. The system of claim 12 wherein the means for acquiring the second address information comprises a series of second message flows among the second group of routers and the second protocol-specific resources.

14. The system of claim 13 wherein the routers are Internet Protocol (IP) routers and wherein the application tool is a simple network management protocol (SNMP) tool configured to generate an IP-centric map specifying topology information.

15. The system of claim 14 wherein the routers include SNMP agents that are queried by the network management station using a SNMP protocol to create the application-centric map.

16. The system of claim 15 wherein the first protocol-specific resources are System Network Architecture (SNA) entities and wherein the series of first message flows comprises SNA message flows.

17. The system of claim 16 wherein the second protocol-specific resources are NetBIOS entities and wherein the series of second message flows comprises NetBIOS message flows.

18. The system of claim 17 wherein the first address information acquired through the SNA message flows comprises IP addresses of the first group of IP routers along with control point (CP) names of the SNA entities.

19. The system of claim 18 wherein the second address information acquired through the NetBIOS message flows comprises IP addresses of the second group of IP routers along with NetBIOS names of the NetBIOS entities.

20. The system of claim 19 further comprising management information blocks (MIBs) stored at the routers for storing the first and second address information.

21. A network management station for correlating information pertaining to heterogeneous resources of an integrated computer network having a host computer, the heterogeneous resources including routers coupled to first and second protocol-specific resources, the network management station comprising:

a processor;

an application tool executing on the processor for generating an application-centric map of the network;

means for receiving first address information from a first group of routers, the first address information pertaining to the first group of routers coupled to the first protocol-specific resources, the first address information further used by the application tool when generating the application-centric map;

means for receiving second address information from a second group of routers, the second address information pertaining to the second group of routers coupled to the second protocol-specific resources; and means for overlaying the second address information onto the application-centric map to correlate the first and second address information and, thus, to facilitate monitoring of the protocol-specific resources by the management station.

22. A method for correlating information pertaining to heterogeneous resources of an integrated computer network having a host computer and a management station coupled to the network, the heterogeneous resources including routers coupled to first and second protocol-specific resources, the method comprising the steps of:

generating an application-centric map of the network at the management station using an application tool;

receiving first address information from a first group of routers at the management station, the first address information pertaining to the first group of routers coupled to the first protocol-specific resources, the first address information further used by the application tool when generating the application-centric map;

receiving second address information from a second group of routers at the management station, the second address information pertaining to the second group of routers coupled to the second protocol-specific resources; and overlaying the second address information onto the application-centric map to correlate the first and second address information and, thus, to facilitate monitoring of the protocol-specific resources by the management station.

* * * * *